US006781676B2

(12) United States Patent
Wallace et al.

(10) Patent No.: US 6,781,676 B2
(45) Date of Patent: Aug. 24, 2004

(54) STRUCTURED LIGHTING DETECTION OF VEHICLE OCCUPANT TYPE AND POSITION

(75) Inventors: Jon K. Wallace, Redford, MI (US); Nicholas M. Zayan, Fenton, MI (US); Stephen R. W. Cooper, Fowlerville, MI (US); Farid Khairallah, Farmington Hills, MI (US)

(73) Assignee: TRW Inc., Lyndhurst, OH (US)

( * ) Notice: Subject to any disclaimer, the term of this patent is extended or adjusted under 35 U.S.C. 154(b) by 155 days.

(21) Appl. No.: 10/104,559

(22) Filed: Mar. 22, 2002

(65) Prior Publication Data

US 2004/0109154 A1 Jun. 10, 2004

(51) Int. Cl.[7] ............................ G01C 3/08; G06K 9/00; B60R 22/00; E05F 15/00
(52) U.S. Cl. ........................ 356/4.03; 382/103; 701/45; 250/221; 250/559.29
(58) Field of Search ............... 250/221, 559.29–559.38; 280/728.1, 735; 342/72; 356/3.01–5.15, 603; 382/103, 106; 701/45

(56) References Cited

U.S. PATENT DOCUMENTS

| 4,257,703 A | | 3/1981 | Goodrich |
| 4,867,570 A | * | 9/1989 | Sorimachi et al. ............. 356/2 |
| 4,948,258 A | * | 8/1990 | Caimi ........................ 356/3.13 |
| 5,054,918 A | | 10/1991 | Downing et al. |
| 5,330,226 A | | 7/1994 | Gentry et al. |
| 5,446,661 A | | 8/1995 | Gioutsos et al. |
| 5,531,472 A | | 7/1996 | Semchena et al. |
| 5,929,980 A | * | 7/1999 | Yamaguchi et al. ........... 356/2 |
| 6,005,958 A | | 12/1999 | Farmer et al. |
| 6,252,240 B1 | * | 6/2001 | Gillis et al. ................. 250/221 |
| 6,441,363 B1 | * | 8/2002 | Cook et al. ................. 180/273 |

* cited by examiner

Primary Examiner—Thomas H. Tarcza
Assistant Examiner—Brian Andrea
(74) Attorney, Agent, or Firm—Tarolli, Sunheim, Covell & Tummino L.L.P.

(57) ABSTRACT

An apparatus (12) for determining the location of a vehicle occupant (20) in a vehicle interior includes a light source (40) for projecting at least one structured light beam (42) onto an area of interest (44) to form a light pattern on the area of interest. A beam divergence control device (50) alters the apparent location of the light source (40) with respect to the area of interest (44). An imager (60) detects the light reflected from the area of interest (44). A characteristic of the reflected light is measured, and the distance between the imager (60) and the area of interest (44) is measured, based on the measured characteristic of the reflected light.

9 Claims, 4 Drawing Sheets

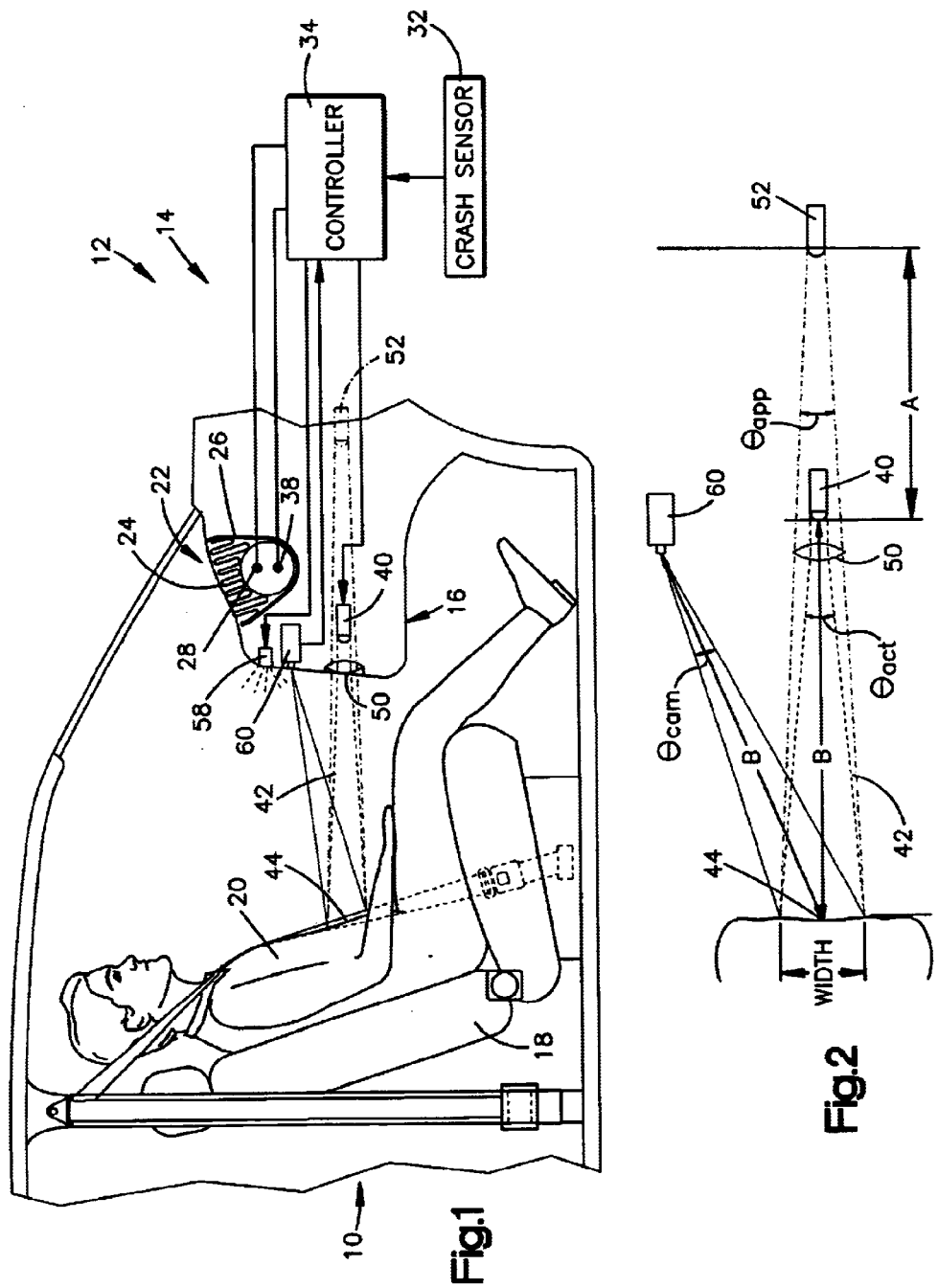

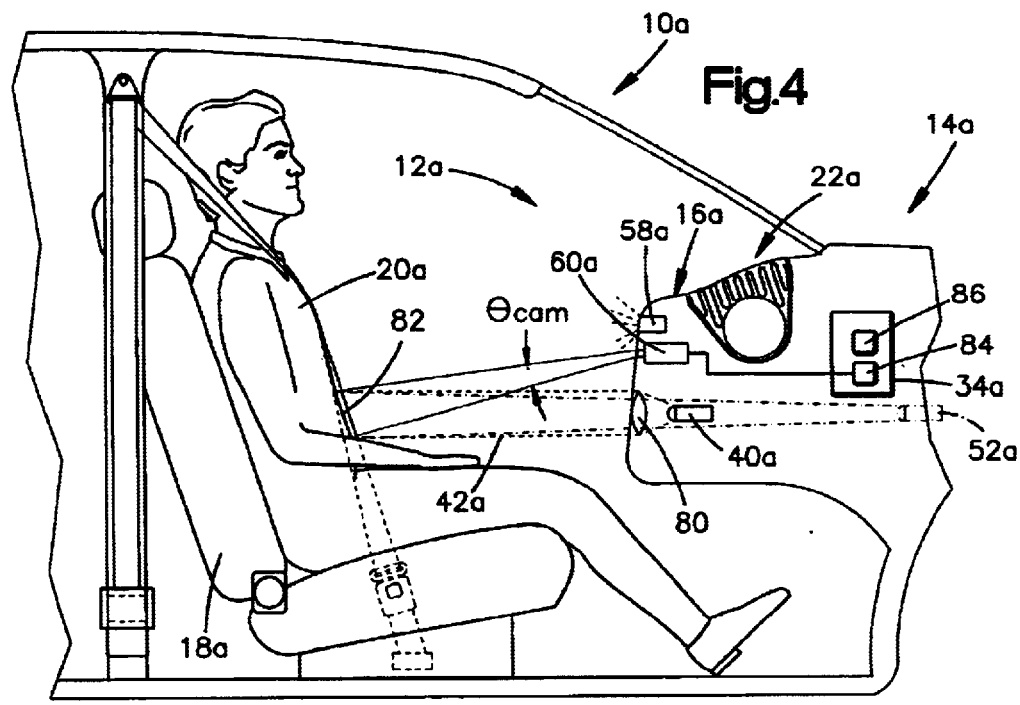
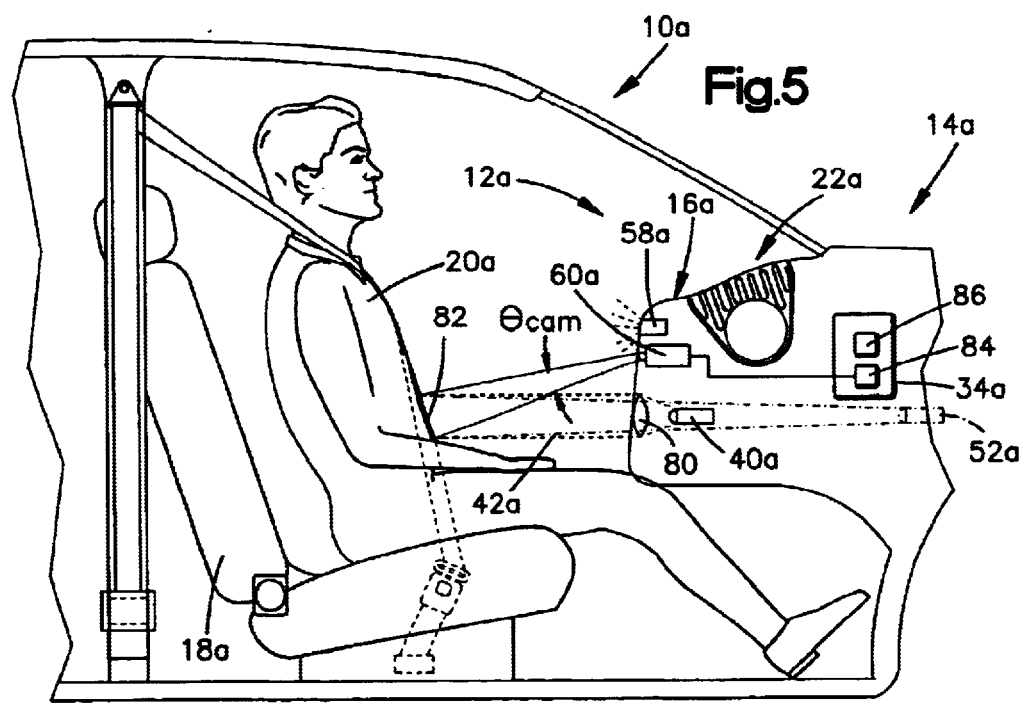

US 6,781,676 B2

STRUCTURED LIGHTING DETECTION OF VEHICLE OCCUPANT TYPE AND POSITION

TECHNICAL FIELD

The present invention is directed to an occupant sensing system and an associated method, and is particularly directed to occupant sensing using an image sensor to sense an occupant.

BACKGROUND OF THE INVENTION

Occupant protection systems are well known in the art and are employed in vehicles to help protect vehicle occupants during a vehicle crash event. Most occupant protection systems include one or more actuatable components, such as an air bag, a seat belt pretensioner, a side curtain, etc. During a crash event, these components may be actuated to help protect the vehicle occupant.

Deployment or actuation of the actuatable component is usually dependent upon numerous criteria, such as crash conditions and/or occupant characteristics. A crash condition may be indicated by a crash metric, such as crash acceleration, crash velocity, crash displacement, etc. For example, if a crash metric, such as crash acceleration, is greater than a predetermined threshold crash acceleration value, then this may be regarded as an indication that the crash event is a deployment crash event (e.g. a crash event having a magnitude and/or duration great enough to warrant actuation of the actuatable protection component).

Relevant occupant characteristics may include presence, position, and weight of the occupant. With reference to an air bag, for example, deploying the air bag is wasteful if an occupant is not present. Also, depending on the size and position of an occupant that is present, deploying the airbag may not enhance protection of the occupant; thus, it may be desirable to suppress actuation. Alternatively, depending on the size and position of an occupant who is present, it may be desirable to limit the pressure of the inflation fluid in the inflated air bag.

Several different arrangements and methodologies have been developed to sense these occupant characteristics. For example, imaging technologies have been utilized to acquire an image of the interior of a vehicle to determine the presence and/or position of an occupant.

U.S. Pat. No. 6,005,958 shows an occupant type and position detection system that uses an infrared camera to generate image data of the front seating area of a vehicle. The data are used to track occupant type and position relative to a fixed structure such as the vehicle instrument panel, to optimize the controlling of deployment of an occupant safety device, such as an air bag.

U.S. Pat. No. 5,531,472 discloses an image sensor that is used to obtain image data which is representative of an occupant on a vehicle seat. The image data is compared to stored image data to obtain the occupant's size and position within the vehicle.

U.S. Pat. No. 5,528,698 discloses an image sensor that acquires a representation of the passenger seat area within a vehicle. Objects within the field of view of the sensor are discriminated to determine whether a rear facing child seat is located in the passenger seat.

In some cases, structured lighting (as opposed to diffuse lighting) is used to create a 3D visual image of an object. Structured lighting alone does not, however, provide sufficient coverage to support 2D occupant recognition techniques. In addition, the source of a structured light must be located at a position and perspective that differs sufficiently from that of the camera to allow recognition of the distortions created by overlaying the structured lighting on an object that has 3D structure. This results in the added cost of extended or dual packaging to accommodate the spaced locations of the camera and light source.

SUMMARY OF THE INVENTION

In one aspect, the present invention is an apparatus for determining the location of a vehicle occupant in a vehicle interior. The apparatus comprises a light source for projecting at least one structured light beam onto an area of interest in the vehicle interior to form a light pattern on the area of interest. A beam divergence control device alters the apparent location of the light source with respect to the area of interest. An imager detects the light reflected from the area of interest. A characteristic of the reflected light is measured, and the distance between the imager and the area of interest is measured, based on the measured characteristic of the reflected light.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIG. 1 is a schematic illustration of a vehicle that includes an occupant location system in accordance with a first embodiment of the invention;

FIG. 2 is an illustration of a determination of the location of an object by the system of FIG. 1;

FIGS. 4 and 5 are views similar to FIG. 1 of an occupant location system in accordance with a third embodiment of the invention.

DESCRIPTION OF THE INVENTION

Figure 3:
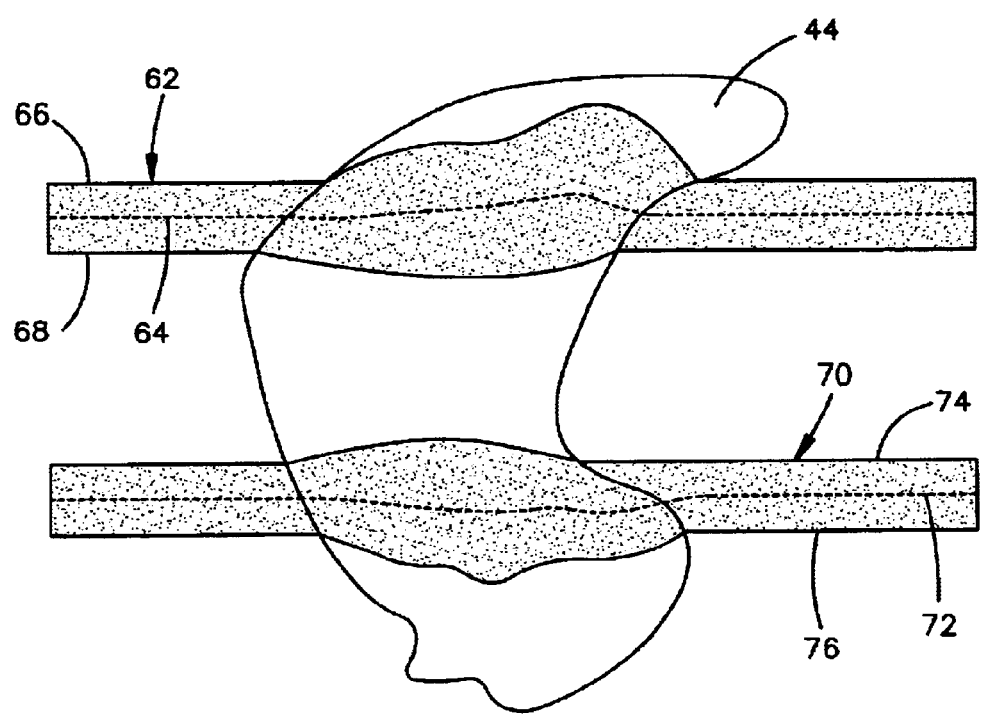
FIG. 3 is a schematic view of a portion of a light pattern projection by an occupant location system in accordance with a second embodiment of the invention.

FIG. 1 illustrates portions of a vehicle 10 that includes an occupant protection system 12. The system 12 includes an occupant location system 14 in accordance with the present invention. The vehicle 10 also includes an instrument panel 16 and an occupant seat 18, on which is shown seated a vehicle occupant 20.

The illustrated occupant protection system 12 includes an air bag module 22. An air bag 24 of the module 22 is operatively stored in a folded condition within a housing 26 of the module. The housing 26 is mounted on the instrument panel 16 of the vehicle 10.

The module 22 includes a source 28 of inflation fluid (e.g., gas) to inflate the air bag to a deployed state (not shown). The inflation fluid source, or inflator, 28 may include pyrotechnic material that is ignited by a squib. Combustion of the pyrotechnic material generates gas (e.g., nitrogen gas). In an alternative embodiment, the inflation fluid source 28 may include a pressurized container of gas. The configuration of the occupant protection system 12 is not a limitation on the present invention, and the illustrated embodiment provides only an exemplary environment for the present invention.

A crash sensor 32 is included within the occupant protection system 12 to sense a vehicle crash event and output a signal indicative thereof. A controller 34 receives the signal from the crash sensor 32. The controller 34 controls actuation of the air bag module 22 based on the output signal from the crash sensor, among other inputs. The controller 34 is typically a microcomputer or microprocessor. Alternatively, the controller 34 may be provided by one or more digital and/or analog circuits. Also, the controller 34 may be provided within an application specific integrated circuit.

The controller 34 is operative to control the rate and degree of air bag inflation, so that the deployment of the air bag 24 is adjustable. In the illustrated example, the deployment of the air bag is adjustable by use of a vent device 38 that is connected to the housing 26 or the air bag 24. The vent device 38 may take any one of a variety of forms, such as an electrically controlled regulator or valve that responds to a control signal.

Another function of the controller 34 is to make determinations regarding the presence and/or position of an occupant. The determinations of the presence and/or position of an occupant are based upon sensory information and are used to help control the actuation/adjustment of the air bag 24. Thus, the controller 34 is part of the occupant location system 14.

Another part of the occupant location system 14, and part of the structure for obtaining sensory information regarding the presence and/or position of the occupant, is an illuminating element in the form of a structured light source 40. The structured light source 40 is located within the interior of the vehicle 10. The structured light source 40 is operatively connected to the controller 34 and selectively illuminates the interior of the vehicle 10 with structured light as described below in response to a control signal provided by the controller 34. By selectively illuminates, it is meant that the structured light source 40 illuminates the interior of the vehicle 10 only when it is turned on or activated by the controller 34. The structured light source does not illuminate the interior of the vehicle 10 when it is not turned on or not activated by the controller 34.

The structured light source 40 may emit light that operates near or in the infrared range such that illumination from the structured light source is not visible to human vision. The structured light source 40 may be configured or programmed to strobe or flash on and off at a predetermined rate such that its activation and deactivation is independent of control signals issued by the controller 34.

The structured light source 40 projects light patterns 42 onto an area of interest 44, in a manner as described below. The light patterns 42 may take any form, but preferably are either horizontal or vertical patterns that appear as stripes in the area of interest 44, or circular dots or spots of light. In the illustrated embodiment, the area of interest 44 is on the vehicle occupant 20 on the seat 18. At least one characteristic of the light pattern 42, as reflected from the area of interest 44, is measured or calculated to provide information useful in controlling the inflator 28 of the occupant protection system 12.

The structured light source 40 projects its light patterns 42 through a lens 50. The lens 50 is a non-linear lens—that is, either a converging lens or a diverging lens. In the example shown in FIGS. 1 and 2, the lens 50 is a diverging lens. The diverging lens 50 spreads the light pattern 42 to increase its width at any location past (to the left as viewed in FIGS. 1 and 2) the lens. As a result, the light pattern 42, exiting from the lens 50, has a width that corresponds to the width of a light pattern that would emanate from a structured light source farther away from the occupant than it actually its. Thus, the lens 50 helps to create an apparent (virtual) structured light source 52 that is farther from the area of interest 44 than the actual structured light source 40. This is described below in detail.

The structure for obtaining sensory information regarding the presence and/or position of an occupant also includes a diffuse light source 58 located within the interior of the vehicle 10. The diffuse light source 58 is operatively connected to the controller 34 and selectively illuminates the interior of the vehicle 10 with diffuse light, as described below, in response to a control signal provided by the controller 34.

An image sensor 60 is located within the interior of the vehicle 10, and is operatively connected to the controller 34. The image sensor 60 may be any type of sensor suitable for acquiring an image of the interior of the vehicle 10. For instance, the image sensor 60 may take the form of a CCD (charge coupled device) image sensor or camera. An image captured by the camera 60 is two-dimensional and is provided within the camera by an array of pixels. The array may, for example, be 640 pixels wide (x-axis image data) and 480 lines or pixels tall (y-axis image data). Other examples for the camera 60 include a CMOS-type device. The camera 60 is preferably located on the same vertical axis (Y axis) as the structured light source 40, to ensure that the projected light pattern 42 stays in the field of view of the camera.

The image sensor 60 conveys a signal indicative of the acquired image to the controller 34. In one embodiment, the image sensor 60 is controlled to acquire the images of the interior of the vehicle 10 in response to control signals issued by the controller 34. Alternatively, the image sensor 60 may be programmed or configured to acquire automatically the images of the interior of the vehicle 10 at one or more predetermined frequencies. In this case, control signals issued by the controller 34 would be unnecessary.

To determine the presence and position of an occupant (e.g., the occupant 20) of the vehicle seat 18, the image sensor 60 initially acquires a first image of the interior while only the diffuse light source 58 is turned on. The interior of the vehicle 10 is illuminated by diffuse light to obtain a standard two-dimensional (2-D) image of the area of interest 44. This image is then sent to the controller 34 for processing by conventional 2-D image analysis techniques to determine features of interest within the field of the picture. A number of these techniques are known to the art.

The image sensor 60 then acquires a second image of the interior of the vehicle 10, when the structured light source 40 is turned on. During this time period, the structured light source 40 projects structured light patterns 42 onto the identified area of interest 44. To ensure that the imaged features (i.e., occupant features) have not shifted in the field of view of the camera 60 between sequential image acquisitions, it is preferred that the first and second images be acquired in rapid succession.

An example of a determination of an object or occupant's position from analysis of the second image is shown pictorially in FIG. 2. The light source 40 projects the light pattern 42 onto the area of interest 44 through the diverging lens 50. The width of the light pattern 42 increases as the light pattern diverges initially from the light source 40. The amount of divergence is increased by the lens 50 to an actual angle of divergence $\theta_{act}$. As a result, the pattern of light 42, when it impinges on the area of interest 44, is wider than it would have been had it not passed through the lens 50. The pattern of light 42 thus appears to emanate from an apparent source 52 that lies behind the structured light source 40 (the actual source)—that is, farther from the occupant 20 than the actual source 40.

Because the light pattern 42 is diverging, the actual width of the pattern on the area of interest 44 on the occupant 20 is determinative of its distance from the apparent source 52. The relationship can be described mathematically as:

$$\text{Width} = \text{Distance} * \sin(\theta_{app}) \tag{1}$$

where $\theta_{app}$ is the angle of the apparent source projection subsumed by the measured light pattern 42 at the area of interest 44.

The width of the light pattern 42 on the area of interest 44 is not measured directly. Instead, the width is determined (calculated) from the size of the angle subsumed by the light pattern as reflected on the imager 60. For convenience of notation, the distance from the image sensor 60 and the actual source 40 to the area of interest 44 is labeled B in FIG. 2. The distance from the apparent source 52 to the actual source 40 is labeled A in FIG. 2. The relationship between the angle subsumed by the pattern on the image sensor 60 and the width of the light pattern 42 at the area of interest 44, can be expressed as follows:

$$\theta_{cam} = \sin^{-1}(\text{Width}/B) \tag{2}$$

where $\theta_{cam}$ is the angle subsumed by the light pattern on the area of interest.

Substituting the width value from (1) into (2) and inserting the new notation of A and B for the relative distances, the relationship between B and the subsumed angle on the image sensor 60 becomes:

$$\theta_{cam} = \sin^{-1}[(A+B)*\sin(\theta_{app})/B] \tag{3}$$

The desirability of using a non-linear lens 50 to distort the light pattern is apparent from (3). Specifically, if the apparent source 52 were in the same front-to-back location as the image sensor 60, for example as the actual source 40 is in FIG. 1, A would be equal to zero. As a result, B would drop out of the equation, and the subsumed image sensor angle would become equal to the projection angle for all distances. Accordingly, all information as to the distance of the area of interest 44 from the image sensor 60, would be lost. That is, the value of $\theta_{cam}$ would provide no useful information about the distance B.

Assuming a non-zero value for A, however, such as results from the use of a non-linear lens 50, B does not drop out of the equation, and there is a unique value of $\theta_{cam}$ for each value B. Therefore, it is possible to determine a distance B for a given pattern width. Since A and $\theta_{app}$ are known quantities from the characteristics of the lens 50 and the projected light pattern 42, and since $\theta_{cam}$ is easily measured, B can be calculated as follows:

$$B = A*\sin(\theta_{app})/[\sin(\theta_{cam}) - \sin(\theta_{app})] \tag{4}$$

This calculation is relatively simple and requires a minimum of processing power. As a result, the distance B to the area of interest 44, can be easily calculated on the basis of the width of the light pattern 42 as it impinges on the area of interest, as viewed by the imager 60.

An additional benefit of this occupant location system 12 is that it is unnecessary to place the light sources 40 and 58 in a location separate (in the front-to-back direction) from the image sensor 60. Instead, one or both of the light sources 40 and 58 can be packaged together with the image sensor 60. This eliminates the costs inherent in dual packaging.

Once the distance of the points on the area of interest 44 from the image sensor 60 is determined, the system 12 analyzes their position in the field of view, of the image sensor using conventional 2-D techniques. The lateral and vertical position of any point relative to the image sensor 60 can be determined by processes known in the art, for example, by noting the angular position of the object within the field of view of the camera. Combining this information with the distance information obtained from the calculation discussed above, it is possible to obtain a true 3-D position for each point. Combining this information with the conventional 2-D image analysis used on the first image, it becomes possible to locate and identify objects or occupants in the interior of the vehicle 10.

In a second embodiment of the invention, multiple light patterns are projected onto an area of interest. FIG. 3 is an illustration of such a projection. In FIG. 3, the projected light patterns are stripes 62 and 70.

The stripes 62 and 70 are projected onto the area of interest 44 using a non-linear lens, as described above with reference to FIGS. 1 and 2. Thus, apparent stripe width and location on the area of interest 44 can be used as a determinant of distance from the imager.

Specifically, the first stripe 62 has a midpoint 64, and upper and lower edges 66 and 68. The second stripe 70 is spaced apart from the first stripe 62. The second stripe 70 has a midpoint 72, and upper and lower edges 74 and 76.

The imager 60 determines the upper and lower edges 66 and 68 of the first stripe 62. Averaging techniques are then used to determine the midpoint 64 of the first stripe 62. The imager 60 determines the upper and lower edges 74 and 76 of the second stripe 70, and averaging techniques are used to determine the midpoint 72 of the second stripe 70.

The system 10 considers the spacing between the midpoints 64 and 72 of the stripes 60 and 72, respectively, to compute the distance to the area of interest 44. The distance calculation is similar to that discussed above with respect to a single light pattern 42.

In a third embodiment of the invention, light patterns (beams) of a specific, unvarying height are projected onto the areas of interest. The light patterns do not diverge as they extend away from the light source. As a result, the apparent height of the light pattern on the area of interest (that is, how much of the field of view of the camera is taken up by the light pattern), is directly indicative of the distance between the light source and the area of interest.

FIGS. 4 and 5 illustrate an occupant location system 12a in accordance with the third embodiment of the invention. The parts of the system 12a are the same as those of the system 12 of the first embodiment, with the exception that the lens 50 is replaced with a beam converging device 80. Parts that are the same are given the same reference numerals with the suffix "a" attached.

The beam converging device 80 may be a converging lens, or a collimator, for example. The beam converging device 80 substantially eliminates the diverging characteristic of the light beam 42a. Thus, the light beam 42a after it leaves the beam converging device 80 is not diffuse light, but is instead one type of "structured" light-specifically, a narrow beam that does not diverge or converge significantly as it approaches the vehicle seat.

For example, if the beam of light 42a produced by the light source 40a is round, as shown in FIGS. 4 and 5, then it has a substantially constant diameter over the distance between the converging device 80 and the seat 18a. That is, the width (diameter) of the beam of light 42a does not change significantly over a range between the converging device 80 and the vehicle seat 18a even when the seat is as far back as possible.

Thus, the actual size of the area of light impinging on an occupant of the seat 18a does not change significantly over a range of object positions between (a) the vehicle seatback when the seat is as far back as possible, and (b) an object, such as a person, located directly in front of the converging device 80 (for example, a person on the floor between the seat and the instrument panel 16). In one embodiment, the actual diameter size of the light beam 42a is one to two centimeters. The light pattern size may, thus, be exaggerated in the drawings.

Alternatively, the light source 40a may, itself, be of the type that produces a non-diverging light beam. In addition, the light source 40a may project stripes of light, as in FIGS. 1–3, or a type of structured light pattern other than a round pattern.

The light pattern 42a on the area of interest 44a subtends an angle at the camera 60a, and occupies a portion of the field of view of the camera. The camera 60a is operative to generate data representative of the amount of the field of view of the camera that is occupied by the area of light 42a on the illuminated occupant 20a. As described below, the amount of the field of view that is occupied by the area of light 42a, and the subtended angle, are used to calculate the distance between the instrument panel 16a and the occupant 20a, without direct measurement of that distance. Thus, the camera 60a is operative to generate data representative of the distance between the instrument panel 16a and the object (occupant 20a) on the vehicle seat 18a.

FIG. 4 illustrates the area of interest 82 as being on an occupant 20a located relatively far from the instrument panel 16a. FIG. 5 illustrates the occupant 20a as being relatively close to the instrument panel 16a. The light pattern 42a from the light source 40a impinges on the occupant 20a and forms an area of light 82 on the surface of the occupant. The area of light 82 has a certain size, including a certain height and width.

Because the light beam 42a does not diverge over the distance between the instrument panel 16a and the occupant 20a, the actual size of the area of light 82 is essentially constant, no matter where the occupant is located in this range. The actual size of the area of light 82 is a constant.

As the occupant 20a gets closer to the camera 60a, the apparent size of the area of light 82 increases. The apparent size of the area of light 22 varies directly with distance.

The area of light 82 appears in the field of view of the camera 60a, and occupies a certain amount of the field of view of the camera—in other words, the area of light subtends a certain angle $\theta_{cam}$ at the camera. The subtended angle $\theta_{cam}$, varies directly with the apparent size of the area of light 82.

As a result, the subtended angle $\theta_{cam}$ at the camera 60, that is, the amount of field of view occupied by the area of light 82, varies directly with and is linearly and inversely proportional to the distance between the light source 40a and the object 20a. The subtended angle $\theta_{cam}$ thus varies directly with distance.

Therefore, the controller 34a can rely solely on the subtended angle $\theta_{cam}$ at the camera 60a, that is, the amount of field of view occupied by the area of light 82, in making the object distance determination.

The camera 60a generates data representative of the amount of the field of view of the camera that is occupied by the area of light 82 on the illuminated object 20a, and representative of the angle $\theta_{cam}$ subtended by the area of light. The data generated by the imager 60a are output to the controller 34a. The controller 34a includes a memory 84 in which are stored values corresponding to certain object distances. The controller 34a includes a comparator 86 that is operative to compare the output from the imager 60a with the stored values in the memory 84. The controller 34a makes a determination as to the distance between the object 20a and the instrument panel 16a.

Figure 6:
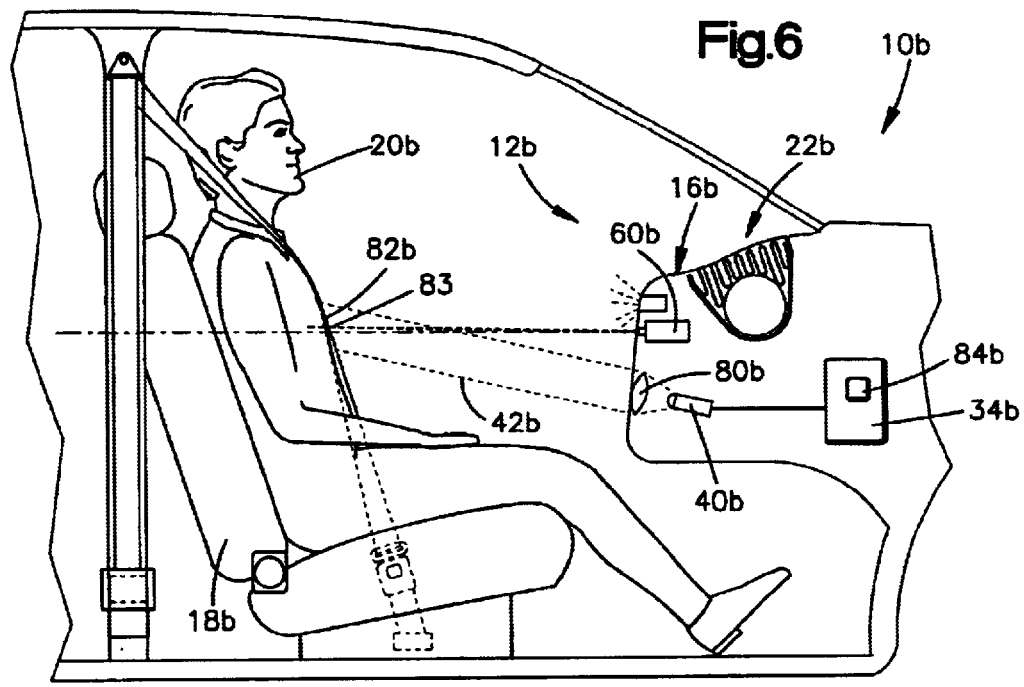
FIGS. 6 and 7 are views similar to FIG. 1 of an occupant location system in accordance with a fourth embodiment of the invention.
Figure 7:
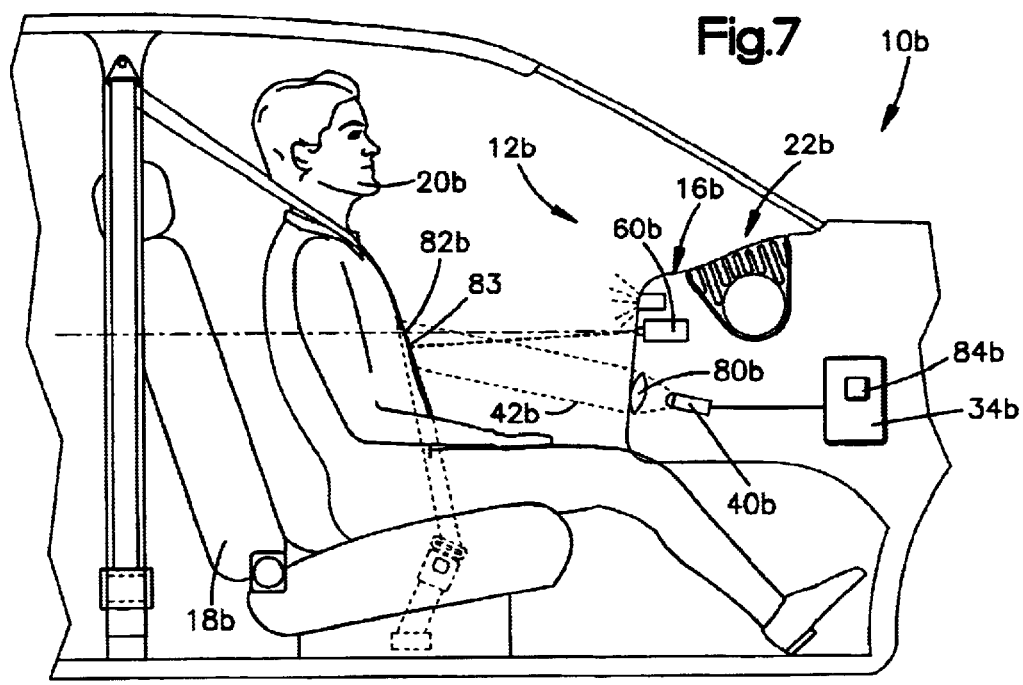

FIGS. 6 and 7 illustrate an occupant location system 12b in accordance with a fourth embodiment of the invention. The system 12b is similar to the system 12a (FIGS. 4 and 5) in that both use a non-diverging light beam 42b that makes a spot of light on an occupant, in a distance measurement system. In the system 12b, however, the vertical location of the spot of light is used as an indirect determinant of distance, rather than the size of the spot of light.

Specifically, the structured light source 40b is mounted so that the light beam 42b extends at an angle, to the horizontal, that is, vertically up or down rather than horizontally. As a result, the center of the light beam 42b is at different vertical locations relative to the imager 60b, when measured at different distances from the light source 40b.

For example, in the illustrated embodiment, the light beam 42b extends upward from the light source 40b to the occupant 20b. When the spot of light 82b is farther away from the light source 40b, the center 83 of the spot of light is relatively high. When the spot of light 82b is closer to the light source 40b, the center 83 of the spot of light is relatively low.

FIG. 6 illustrates the illuminated object as being an occupant 20b located relatively far from the instrument panel 16b. The beam of light 42b from the illuminator 40b impinges on the person and forms an area or spot of light 82b having a center 83. The spot of light 82b appears in the field of view of the camera 60b. The camera 60b generates data representative of the vertical location of the center 83 of the spot of light 82b on the illuminated object 20b. The data generated by the camera 60b are output to the controller 34b.

FIG. 7 illustrates the person 20b as being relatively close to the instrument panel 16b. The beam of light 42b from the illuminator 40b impinges on the person and forms an area or spot of light 82b. The spot of light 82b has a center 83 that is higher than the location of the center in FIG. 6. The camera 60b generates data representative of the vertical location of the center 83 of the spot of light 82b on the illuminated object 20b. The data generated by the camera 60b are output to the controller 34b.

The controller 34b includes a memory 84b in which are stored values of the vertical height of the spot center 83. The values corresponds to object distances. On the basis of a reading of the stored values, the controller 34b makes a determination as to the distance between the object 20b and the instrument panel 16b. Because the location of the spot center 83 in FIG. 6 is higher than the location of the spot center in FIG. 7, the controller 34b determines that the occupant 20b is farther away from the instrument panel in FIG. 6, and closer in FIG. 7.

From the above description of the invention, those skilled in the art will perceive improvements, changes and modifications in the invention. Such improvements, changes and modifications within the skill of the art are intended to be covered by the appended claims.

Having described the invention, we claim:

1. A method of determining the location of a vehicle occupant in the interior of a vehicle, said method comprising the steps of:

projecting at least one structured light pattern from a light source onto an area of interest in the vehicle;

altering the apparent location of the light source with respect to the area of interest;

detecting a reflected light pattern with an image sensor;

measuring a characteristic of the light pattern on the area of interest; and calculating the distance of points on the area of interest from the image sensor on the basis of the measured characteristic, wherein said projecting step includes projecting at least one non-diverging light pattern onto the area of interest, said measuring step includes measuring the width of the light pattern on the area of interest, and said calculating step includes determining the amount of the field of view of the imager sensor that is occupied by the reflected light pattern.

2. A method as set forth in claim 1 wherein said projecting step further includes projecting a circular light pattern and said measuring step further includes measuring an apparent diameter of the light pattern on the area of interest.

3. A method as set forth in claim 1 wherein said projecting step includes creating a light pattern on the area of interest whose apparent width changes at a different rate than a rate of change of the distance between the area of interest and the image sensor, as the area of interest moves relative to the image sensor.

4. A method as set forth in claim 1 wherein said calculating step includes comparing data generated by the image sensor with stored data representing a relationship between (a) a distance between the area of interest and the image sensor, and (b) an angle at the image sensor that is subtended by the area of light.

5. Apparatus for determining the location of a vehicle occupant in a vehicle interior, comprising:

a light source for projecting at least one structured light pattern onto an area of interest in the vehicle;

at least one lens for altering an apparent location of said light source with respect to the area of interest;

an image sensor for detecting light reflected from the area of interest;

means for measuring a characteristic of the reflected light; and means for determining a distance between said image sensor and the area of interest based on the measured characteristic of the reflected light, wherein said light pattern is at least one non-diverging light pattern projected onto the area of interest, said means for measuring is adapted to measure a width of the at least one non-diverging light pattern on the area of interest, and the means for determining is adapted to determine an amount of a field of view of said image sensor that is occupied by the reflected light pattern.

6. Apparatus as set forth in claim 5 wherein said light source is adapted to project a circular beam of light, and said means for measuring is adapted to measure an apparent diameter of the light pattern on the area of interest.

7. Apparatus as set forth in claim 5 wherein said light source is adapted to project a stripe of light, and said means for measuring is adapted to measure an apparent width of the stripe of light on the area of interest.

8. A method of determining the location of an area of interest in the interior of a vehicle, said method comprising the steps of:

projecting a non-diverging light beam onto the area of interest in the vehicle interior to form a light pattern on the area of interest;

detecting light reflected from the area of interest with an image sensor, the non-diverging light beam being projected at a vertical angle relative to the image sensor;

measuring a vertical center of the light pattern on the area of interest and relative to said image sensor; and determining a distance between said image sensor and the area of interest based on the measured vertical center of the light pattern relative to said image sensor.

9. Apparatus for determining the location of a vehicle occupant in a vehicle interior, comprising:

a light source for projecting a non-diverging light beam onto an area of interest in the vehicle interior to form a light pattern on the area of interest;

an image sensor for detecting light reflected from the area of interest, said light source projecting the non-diverging light beam at a vertical angle relative to the light source;

means for measuring a vertical center of the light pattern on the area of interest and relative to said image sensor; and means for determining a distance between said image sensor and the area of interest based on the measured vertical center of the light pattern relative to said image sensor.

* * * * *